US007908297B2

(12) United States Patent
Waldman et al.

(10) Patent No.: US 7,908,297 B2
(45) Date of Patent: Mar. 15, 2011

(54) USER INTERFACE PROPERTY MAPPING

(75) Inventors: Chad Garrett Waldman, Sammamish, WA (US); Arif Kureshy, Sammamish, WA (US); Christian Hagel-Sørensen, Sammamish, WA (US); Jeppe Oskar Meyer Larsen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 321 days.

(21) Appl. No.: 11/384,051

(22) Filed: Mar. 17, 2006

(65) Prior Publication Data

US 2007/0220039 A1    Sep. 20, 2007

(51) Int. Cl.
*G06F 17/30* (2006.01)
(52) U.S. Cl. ........................................ 707/803; 715/762
(58) Field of Classification Search .................. 707/1, 2, 707/3, 10, 100, 102; 715/762; 717/109
See application file for complete search history.

(56) References Cited

U.S. PATENT DOCUMENTS

| | | | |
|---|---|---|---|
| 5,334,992 A | 8/1994 | Rochat et al. | |
| 6,362,808 B1 | 3/2002 | Edge et al. | |
| 6,894,806 B1 | 5/2005 | Woolfe et al. | |
| 6,967,746 B1 | 11/2005 | Walker et al. | |
| 6,986,107 B2 | 1/2006 | Hanggie et al. | |
| 2001/0044801 A1 | 11/2001 | Senn et al. | |
| 2002/0024505 A1 | 2/2002 | Eftekhari | |
| 2003/0197710 A1 | 10/2003 | Gonsalves et al. | |
| 2003/0231204 A1* | 12/2003 | Hanggie et al. | 345/744 |
| 2004/0201632 A1* | 10/2004 | Stoakley et al. | 345/853 |
| 2005/0114475 A1* | 5/2005 | Chang et al. | 709/220 |
| 2005/0146734 A1 | 7/2005 | Stokes et al. | |
| 2005/0193331 A1 | 9/2005 | Grambihler et al. | |
| 2006/0007240 A1 | 1/2006 | Herbert et al. | |
| 2006/0015847 A1* | 1/2006 | Carroll, Jr. | 717/109 |
| 2006/0130048 A1* | 6/2006 | Ho et al. | 717/170 |

OTHER PUBLICATIONS

Luyten et al., "An XML-Based Runtime User Interface Description Language for Mobile Computing Devices," Springer, http://www.springerlink.com/(fzsjtcmgnbyb142j5uwcud45)/app/home/contribution.asp?referrer=parent&backto=issue,1,12;journal,1631,3296;linkingpublicationresults,1:105633,1.
Foley et al., "A Knowledge-Based User Interface Management System," 1988, http://delivery.acm.org/10.1145/60000/57178/p67-foley.pdf?key1=57178&key2=0729570411&coll=GUIDE&dl=GUIDE&CFID=69625979&CFTOKEN=56471312.
Haber et al., "Opossum: Desk-Top Schema Management through Customizable Visualization," Proceedings of the 21th VLDB Conference, Zurich, Switzerland 1995, http://www.plunk.org/eben/PublishedPapers/Wisconsin/VLDB95.pdf.

* cited by examiner

*Primary Examiner* — Charles Kim
*Assistant Examiner* — Anteneh Girma
(74) *Attorney, Agent, or Firm* — Marshall, Gerstein & Borun LLP

(57) ABSTRACT

A user interface (UI) property mapping system allows for efficient collaboration between a user experience (UX) team and a technical development team developing the UI. The UI mapping system assigns each component of the UI an identification key and exposes the identification key externally through an XML Schema, wherein such an XML Schema may be used by a UX team to generate an XML file specifying values of various properties of the UI. Subsequently, a UI object model reads the XML file to retrieve the values of various properties of the UI as specified by the UX team. The UI property mapping system may encode the XML file into a resource file that may be shipped with the final software using the UI. Alternatively, the XML file may be exposed for external modifications by end users to make changes to the UI as they desire.

19 Claims, 6 Drawing Sheets

USER INTERFACE PROPERTY MAPPING

BACKGROUND

Computers and computer software make up a very important part of modern life and business. In today's business environment, for any organization to stay competitive, it is imperative that it uses computers and software applications to manage data, customers, employees, finances, etc. Generally speaking, organizations use specialized application to use one or more of their various operations. For example, businesses use accounting software to manage their accounting, tax, payroll, and other accounting related functions, whereas customer relationship management (CRM) software is used to manage customer accounts, orders, etc. Most businesses implement their core enterprise applications such as enterprise resource planning (ERP) and CRM at different times, using products developed by different vendors.

Most of such business applications use multiple user interfaces (UIs), including graphical user interfaces (GUIs), on a multitude of platforms (desktop PC, a hand-held device, etc.), to interact with users. For example, a CRM application may use a UI to present customer data to a user, to receive inputs from a user that are to be saved in the customer data, etc. It is possible that a user of the CRM application, such as a customer service representative, may spend a lot of time working with such UI. Therefore, it is important that UIs are appealing and pleasant to work with as well as designed to efficiently interact with a user.

Generally speaking, UI's include a number of components such as toolbars, status bars, child windows, etc., all of varying shapes, textures, sizes, colors, and fonts of the text displayed. Throughout the technical development of UI's, the technical developers collaborate with the graphic designers, often part of a user experience team, on the development of UI's. One of the challenges of UI development is to ensure that properties of various components of the UI's meet the requirements of the designers from the user experience (UX) team.

In a typical UI development cycle, the UX team gives initial specifications to the developers. Throughout the development cycle of the UI, the UX team reviews the appearance, user experience, etc., of the UI at various points and provides further changes to the UI properties as per the result of their review. Subsequently, the UX team reviews the next version of the UI to see if it meets their revised requirement. Due to the time involved in getting reviews back and forth between the UX team and the development team, a typical UI development may involve several such revisions. Therefore, the development process may be quite inefficient, involving significant time and monetary overheads.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A user interface (UI) property mapping system allows for efficient collaboration between a UX team and a technical development team developing the UI. The UI mapping system assigns each component of the UI an identification key and exposes the identification key externally through an XML Schema, wherein such an XML Schema may be used by a UX team to generate an XML file specifying values of various properties of the UI. Subsequently, a UI object model reads the XML file to retrieve the values of various properties of the UI as specified by the UX team.

In an embodiment of the UI property mapping system, the identification key for a particular component may comprise the particular component's object group information, object information and theme information. In an alternate embodiment of the UI property mapping system, the XML document is converted into a resource file that may be included as part of the final version of the software using the UI. The resource file may be embedded within an executable file, a dynamic link library (DLL) file, etc.

Yet another embodiment may provide multiple XML files, wherein a system can select an XML file based on the user or any other predetermined criteria. For example, the UI settings specified by each of the multiple XML files may be optimized for a particular user, a particular situation, etc. Thus, a simplified UI may be provided for data entry purposes while a richer UI is provided for an alternate situation.

BRIEF DESCRIPTION OF DRAWINGS

The present patent is illustrated by way of examples and not limitations in the accompanying figures, in which like references indicate similar elements, and in which.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Network

Figure 1:
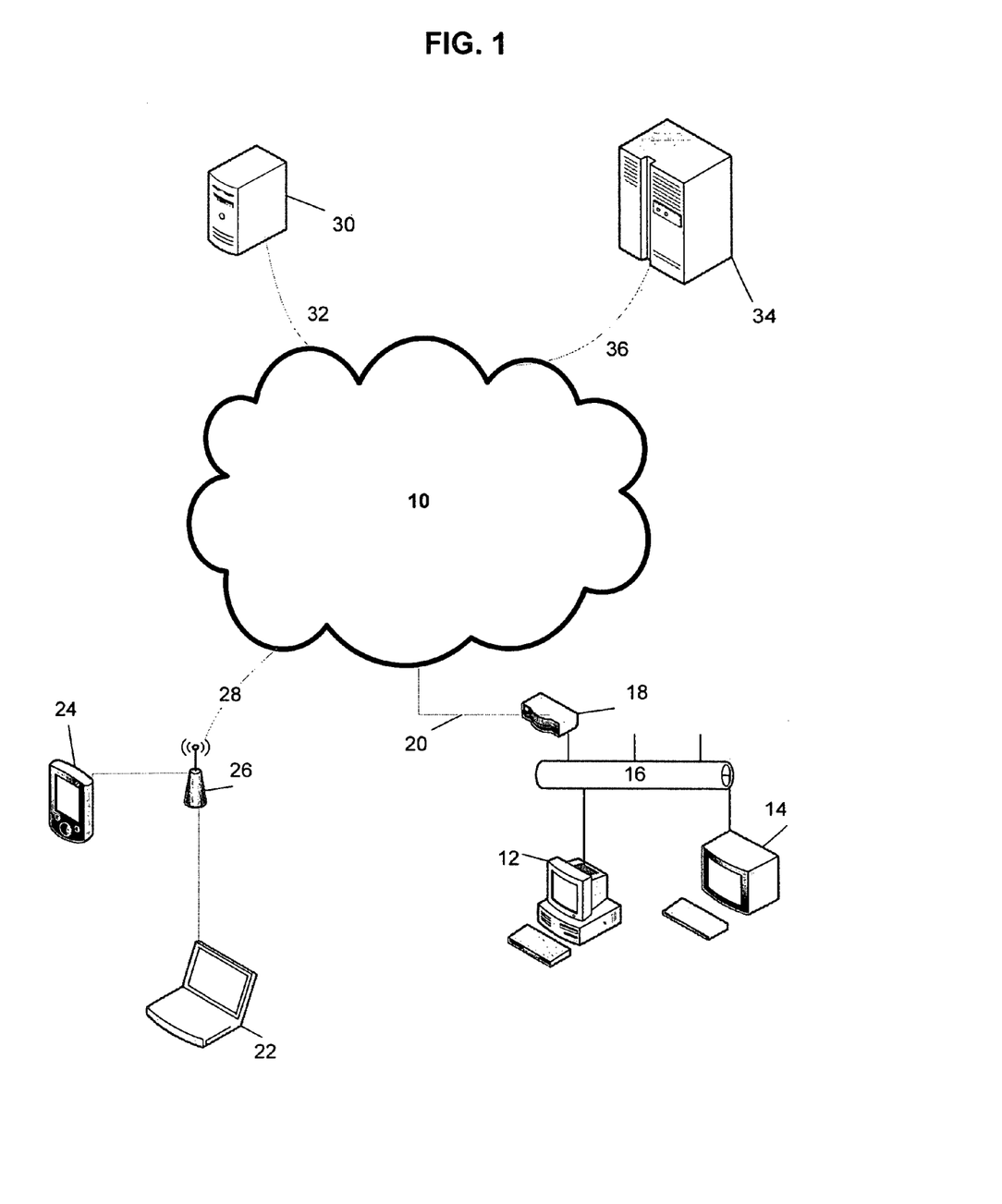
FIG. 1 is a block diagram of a network interconnecting a plurality of computing resources.

FIG. 1 illustrates a network 10 that may be used to implement a user interface (UI) property mapping system described herein. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36. As it will be described below in further detail, one or more components of the UI property mapping system may be stored and operated on any of the various devices connected to the network 10. For example, the UI property mapping system described in here may include an XML editor located on each of the various devices such as the personal computer 12 and a security software adapted to verify a user's identity on the mainframe 34.

Computer

Figure 2:
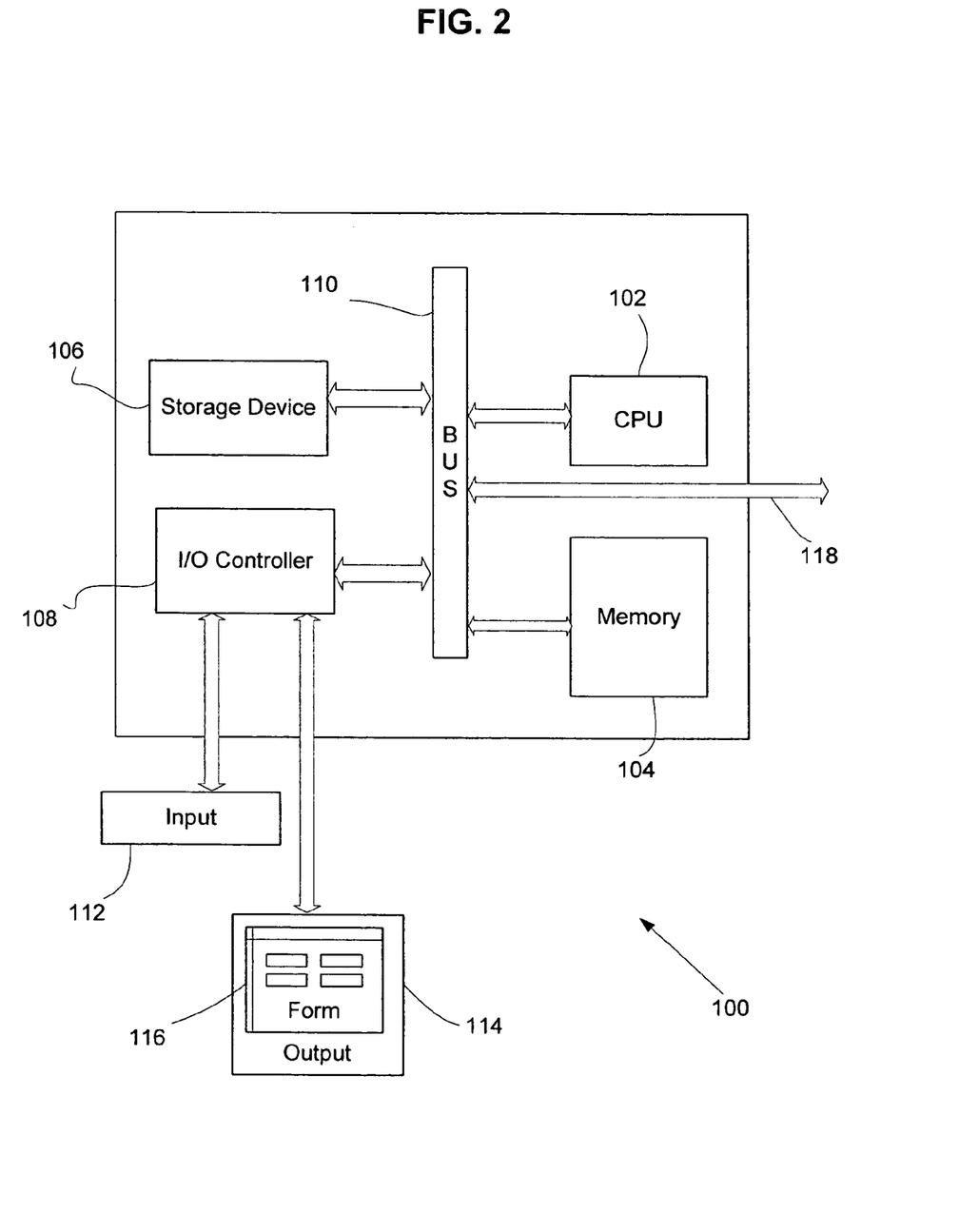
FIG. 2 is a block diagram of a computer that may be connected to the network of FIG. 1.

FIG. 2 illustrates a computing device in the form of a computer 100 that may be connected to the network 10 and used to implement one or more components of a UI property mapping system described herein. Components of the computer 100 may include, but are not limited to a central processing unit (CPU) 102, a memory 104, a storage device 106, an input/output controller 108, and a system bus 110 that couples various system components including the memory to the CPU 102. The system bus 110 may be any of several types of bus structures including a memory bus or memory controller, a peripheral bus, and a local bus using any of a variety of bus architectures.

The memory 104 may include computer storage media in the form of volatile and/or nonvolatile memory such as read only memory (ROM) and random access memory (RAM). A basic input/output system (BIOS), containing the basic routines that help to transfer information between elements within computer 110, such as during start-up, is typically stored in ROM. RAM typically contains data and/or program modules that are immediately accessible to and/or presently being operated on by processing unit 102. The memory 104 may also be used to store data related to one or more components and resources used by the computer 100. For example, the memory 104 may be used to store an XML file defining various properties of a UI, wherein the XML file is shared by a UX team and a development team of the UI.

The storage device 106 may typically include removable/non-removable, volatile/nonvolatile computer storage media. By way of example only, the storage device 106 may include a hard disk drive, a magnetic disk drive, nonvolatile magnetic disk 152, an optical disk drive, etc. One or more of the forms stored on the memory 104 may be populated using data stored on the storage device 106. The I/O controller may be used by the computer 100 to communicate with an input device 112, which may be a keyboard, a mouse, etc., an output device 114, which may be a monitor, a printer, etc.

User Interface Property Mapping

Extensible markup language (XML) provides a fairly complete set of tools for describing the parts of a document (elements), annotating those parts (attributes), and constraining the parts that can appear within the elements and attributes (content models and attribute types). A schema may also be viewed as an agreement on a common vocabulary for a particular application that involves exchanging documents. In schemas, models are described in terms of constraints.

An XML schema describes a model for a whole class of documents. Such an XML schema may be used for exchanging information regarding a plurality of properties of an application object during the development of an application. For example, an XML schema defining various properties of an application object, such as a user interface (UI) may be exposed external to the application, wherein a user external to the application development may use the XML schema to generate an XML file that defines various properties of the application object.

Figure 3:
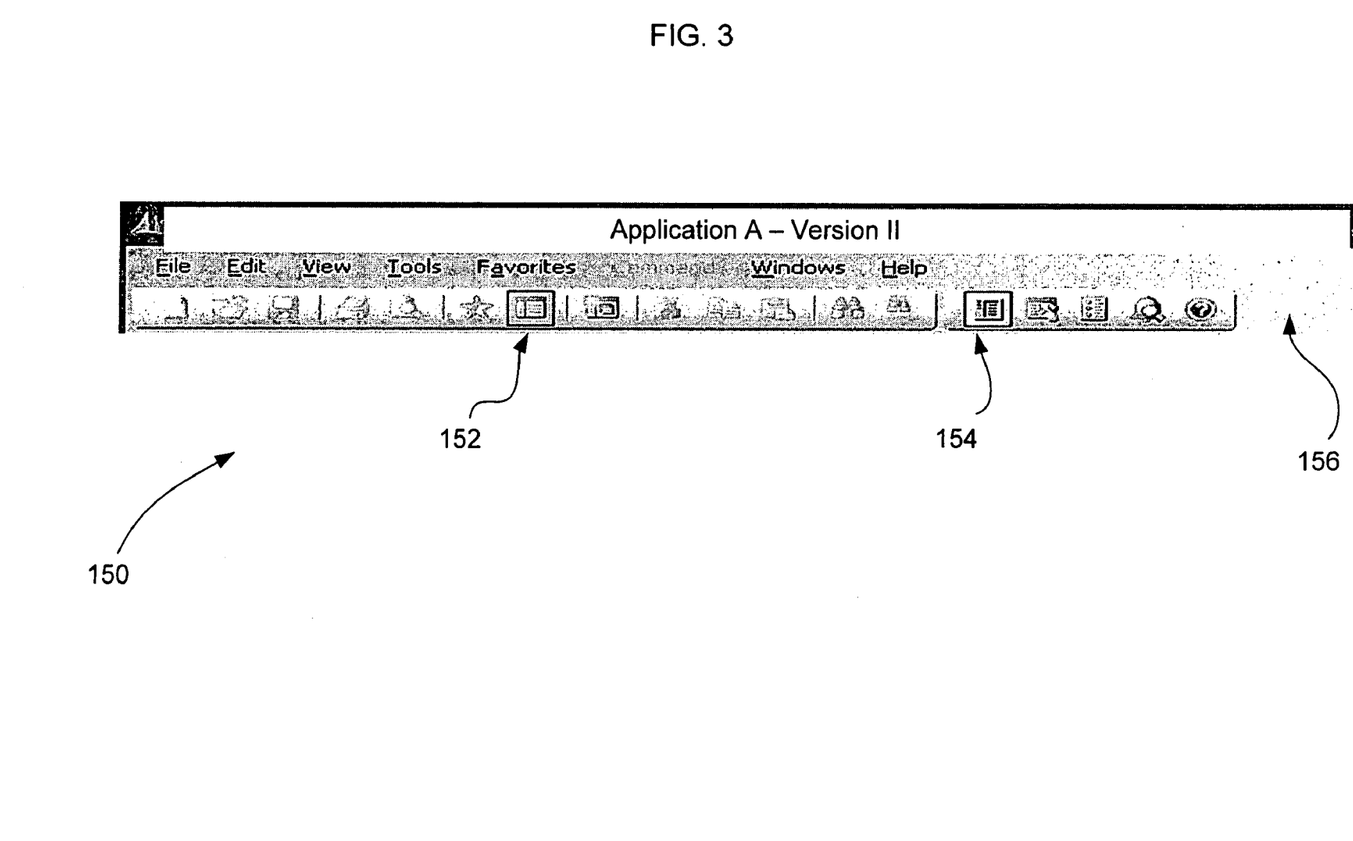
FIG. 3 illustrates an exemplary UI toolbar whose properties may be mapped using the property mapping program.

Now referring the FIG. 3, a UI menu bar 150 illustrates various UI features that may be provided with a UI for an application A. The application A may be, for example, a customer relation management (CRM) application, an enterprise resource planning (ERP) application such as the Microsoft™ Dynamic AX™, etc. The UI menu bar provides a number of drop-down menu choices, such as a File drop-down menu, an Edit drop-down menu, etc. Additionally, a number of buttons, wherein each of the buttons provides a function or defines a property of the application may also be provided. As a user of ordinary skill in designing and using various UIs would know, some of these buttons may be highlighted to reflect present selection and/or options available to a user of the UI, while some of the other buttons may be non-highlighted to notify the user that a function performed by such a non-highlighted button is currently not available and/or not selected at present time.

The illustration of the UI bar 150 includes a selected state of a button 152 by highlighting the button and providing the button with highlighted boundary lines. In an alternate embodiment of the UI bar 150, the selected button 152 may be illustrated by a changed color of the selected button 152, by providing shadow lining to the selected button 152, etc. Similarly, a button having a mouse over it (mouse-over button) 154 may also be illustrated by highlighted boundaries, etc. The colors of the various buttons, the color of the background 156 of the UI menu bar 150, etc., are generally determined by a UX team that is responsible to ensure optimum user experience with the UI bar 150.

Figure 4A:
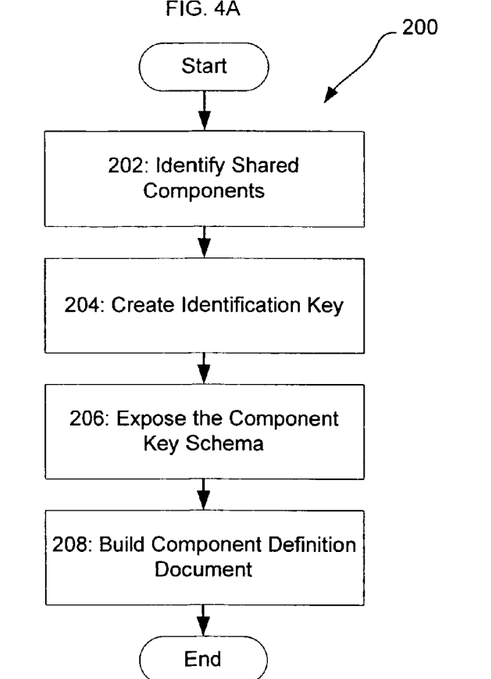
FIGS. 4A-4C illustrate workflows for creating and using component definition document mapping properties of a UI.

Now referring to the embodiments of the UI property mapping system illustrated in here, FIG. 4A illustrates a workflow 200 for creating a component definition document that may be used to map properties of a UI or any other object of an application where collaboration between a UX team and a development team for the UI or any other object.

A block 202 identifies various component properties of an application object that may be shared between an application development team and a usability definition team. For example, for a user interface being an application object, block 202 may determine that a toolbar, a toolbar color, various buttons on the toolbar, etc., are component properties that may be shared between a development team and a UX team. Not that in an alternate embodiment, a plurality of other teams, such as a user assistance team responsible for drafting the text within the UIs, a user focus group team, etc., may also share component properties for a UI.

Once the components are identified, block 204 creates an identification key for each of the components identified at block 202. For example, the identification key may be made of three different parts to make it unique: an object group, an object and a theme. For example, the object group may be the object itself. Thus, when creating a key for a toolbar of an UI, the object group may be "Toolbar." Each object group may include a plurality of objects. For example, for the Toolbar object group, the objects may be the background, SelectButtonBackground (background for a button selected by a user), MouseOverButtonBackground (background for a button over which a user mouse may be positioned), etc. So, for example, one of the identification keys may have as part of its name, ToolbarBackground. While the identification key is described to include the three parts discussed above, in an alternate embodiment, the identification key may also include various other information.

Although this is unique to the application, there still exists one more variable which needs to be taken into account, such as a selected operating system theme. For example, for Windows™, such themes may include XP Blue (Normal), XP Olive Green (Homestead), XP Silver (Metallic), Classic, etc., all of which are setup at the operating system level. Similarly, alternate themes may be included as part of the identification key for an alternate operating system. Because it may be necessary to adjust the coloring of a UI based on a selected theme, the theme names may be used to allow assigning different colors per theme. Thus, in this case, the final identification key might actually look like: ToolbarBackgroundNormalColor, (where NormalColor may be the technical/internal name for XP Blue theme).

Moreover, alternate embodiments may provide multiple XML files, wherein a system can select an XML file based on the user or any other predetermined criteria. For example, the UI settings specified by each of the multiple XML files may be optimized for a particular user, a particular situation, etc. Thus, a simplified UI may be provided for data entry purposes while a richer UI is provided for an alternate situation.

Subsequently, a block 206 exposes the identification keys externally via a component key schema. For example, an XML schema may be used to expose various identification keys for an application. The XML schema may branch each component of the application object, as identified by its unique identification key into a different branch. The XML schema may be read by a UX team or any other team that is responsible for determining the values of various properties of the application object.

Subsequently, a block 208 generates a component definition document using the component definition schema exposed at block 208. If the component definition schema is an XML schema, the block 208 may generate a component definition XML file using the schema. Each component may be assigned a unique value for a property. For example, each theme can be assigned a unique color. Furthermore, it is sometimes not so simple as to assign a solid Red-Green-Blue (RGB) color to a component. For example, a color may need to be mutated, such as by adjusting the luminance of a variable operating system color. In order to achieve this, the component definition XML file may not only describe the colors as simple RGB values, but also as functions to achieve the desired effect.

Following is an example of a section of a component definition XML file defining colors for a toolbar background and for a border around a toolbar function:

```
<objectgroup Name ="Toolbar">
    <!-- Background of toolbar -->
    <object Name="Background">
        <!-- XP Blue theme -->
        <theme Name ="NormalColor">
            <!-- Standard RGB color specified in hex format -->
            <hexcolor Val ="#ddecfe"/>
        </theme>
        <!-- XP Olive Green theme -->
        <theme Name ="HomeStead">
            <!-- Standard RGB color specified in hex format -->
            <hexcolor Val ="#f4f7de"/>
        </theme>
        <!-- XP Silver theme -->
        <theme Name ="Metallic">
            <!-- Standard RGB color specified in hex format -->
            <hexcolor Val ="#f3f4fa"/>
        </theme>
        <!-Classic theme -->
        <theme Name ="Classic">
            <!- Make the Windows System color "Window"
            25% transparent -->
            <setopacity Percent="0.75">
                <syscolor Val="Window" />
            </setopacity>
        </theme>
    </object>
    <!-- Border around toolbar button -->
    <object Name="ButtonBorder">
        <theme Name ="NormalColor">
            <hexcolor Val ="#cae1fc"/>
        </theme>
        <theme Name ="HomeStead">
            <hexcolor Val ="#cedca7"/>
        </theme>
        <theme Name ="Metallic">
            <hexcolor Val ="#e1e2ec"/>
        </theme>
        <theme Name ="Classic">
            <!-- Darken the Windows System color "Control" by 10% -->
            <adjustlum Percent ="0.1" Op ="Darken">
                <syscolor Val="Control"/>
            </adjustlum>
        </theme>
    </object>
</objectgroup>
```

During the development phase of the UI, a designer from the UX team may modify the component definition XML file whenever they deem it necessary. While the designer cannot change component definitions after the UI is delivered to a user, the designer may hand over one or more sets of modifications to component definitions to the user so that the user can choose to apply one of these sets to the UI whenever they deem it necessary. For example, a designer may change the color transparency from 75% to 50% by changing the setopacity percent from 0.75 to 0.50. Moreover, color functions in the component definition XML file can also be nested. In fact, syscolor is a color function since it looks up and returns the system color in an RGB format. Therefore, in the example above, the classic theme for ButtonBorder has two functions nested together; syscolor and adjustlum. There can be any number of functions nested together to form the new RGB value which is eventually used by the application.

Because an XML file is not considered source code affecting the functionality of an application, non-developers may be allowed to modify the XML file without introducing any risk to the application development process. An external application may be used to automatically generate the component definition XML file or to make changes to it as per the direction of the UX team, marketing group, customers, partners, etc.

Figure 4B:
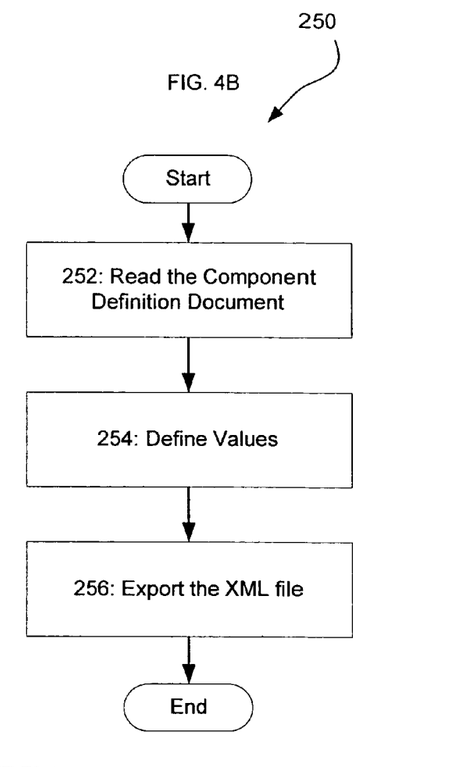

FIG. 4B illustrates a program 250 that uses the component definition document generated by the workflow 200. At a block 252, the program 250 may read the component definition document file generated at the block 208. At a block 254 the program 250 may define values for each of the various keys of the component key schema to generate a component definition XML file. Subsequently, at a block 256 the program 250 may export/hand-over the component definition XML file to the application using the UI defined by the XML file. The application may read the component definition XML file upon its start-up to render the UI using the component property values defined in the component definition XML file.

Figure 4C:
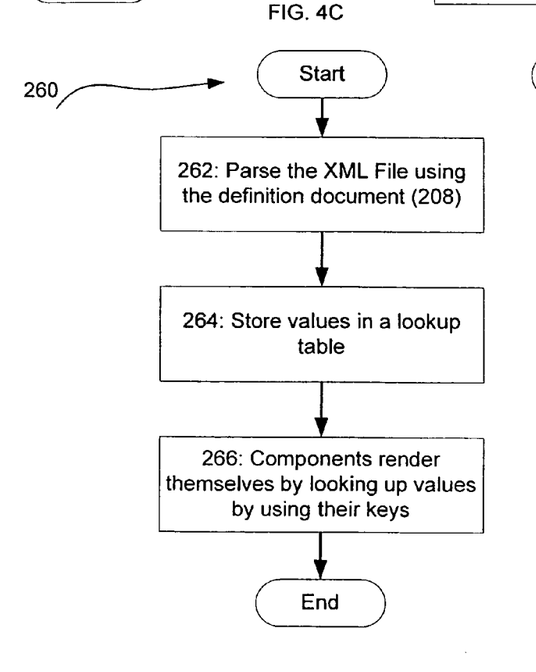

FIG. 4C illustrates a program 260 that uses the component definition XML document generated by the workflow 250. At a block 262, the program 260 parses the XML component definition document using the schema defined in the block 208. Subsequently, at a block 264 the program 260 stores the values received from the parsing function of block 262 into a lookup table, wherein such a lookup table may be indexed by the component keys. Finally, at a block 264, various UI components retrieve the values from the lookup table and render themselves.

Once the final values of various component properties are determined, and once the application using the UI is ready for release, the component definition XML file may be converted into a resource encoded into a binary/executable file, where such binary file is used by the released application. Alternatively, the component definition XML file may be exposed in plain text format for external modifications by a user of the released application. This allows the user to make changes to the UI as they desire.

As one of ordinary skill in the art would appreciate, not all the blocks of the workflows 200 and 250 need to be performed for a given implementation of the workflows 200 and 250. As some blocks of the workflows 200 and 250 may be used primarily to increase the efficiency of the workflows 200 and 250, one or more such blocks may be omitted in a given implementation without affecting the functionality of the workflows 200 and 250. Moreover, one or more of the blocks in the workflows 200 and 250 may also be implemented in an alternate order without affecting the functionality of the workflows 200 and 250. The workflows 200 and 250 may be implemented using software, hardware, firmware or any combination thereof.

Figure 5:
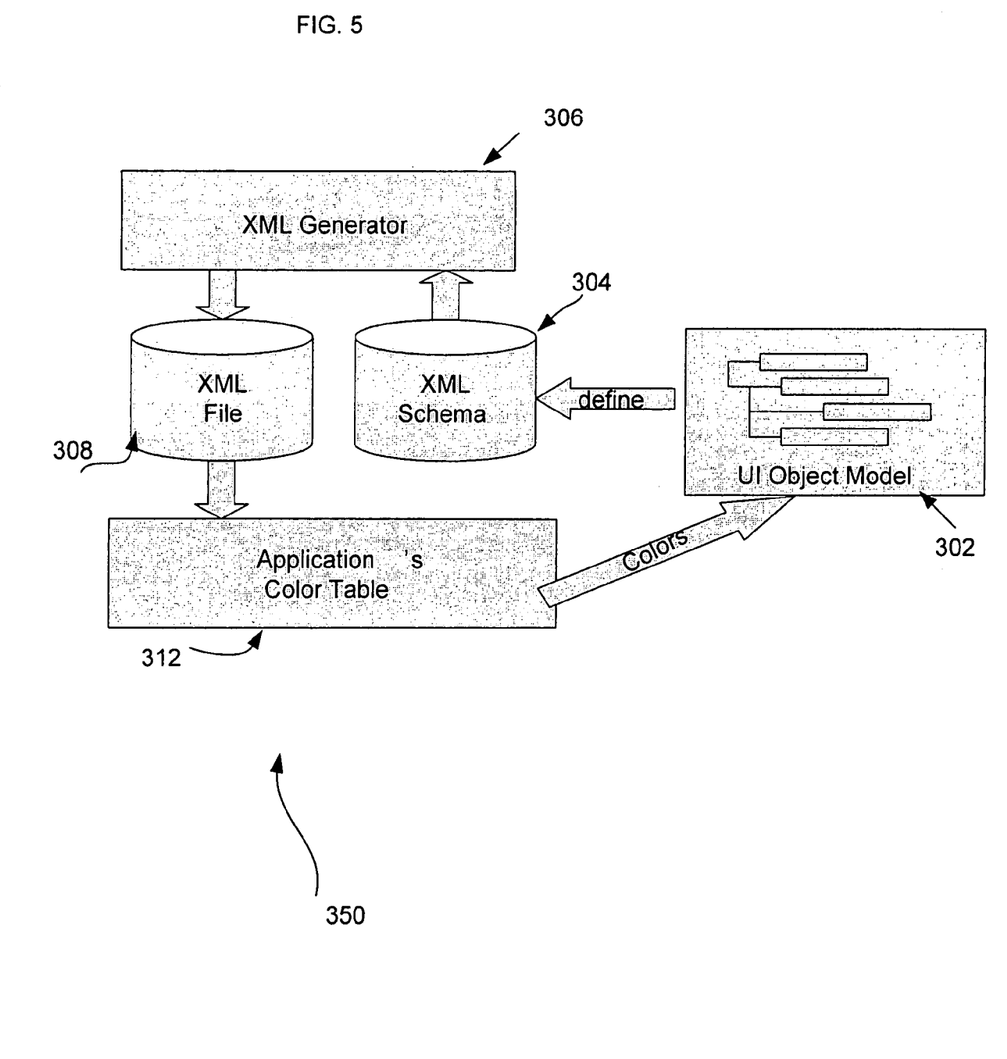
FIG. 5 is an exemplary block diagram of a UI property mapping system.

Now referring to FIG. 5, a block diagram illustrates an embodiment of a UI property mapping system 300. As shown in FIG. 5, during product development stage the development team using the UI object model 302 defines and exposes a component definition schema, such as an XML schema 304. The UX team may use an XML generator 306 to generate a component definition file, such as a component definition XML file 308. The XML generator 306 may provide a wizard or any other type of tool to help the UX team to define various component values for the UI. When the development team opens the UI, the application may read the component definition XML file 308 to get various component property values for the UI, read such property values into application's property table, such as the application's color table 312 and use the values to render the UI.

Figure 6:
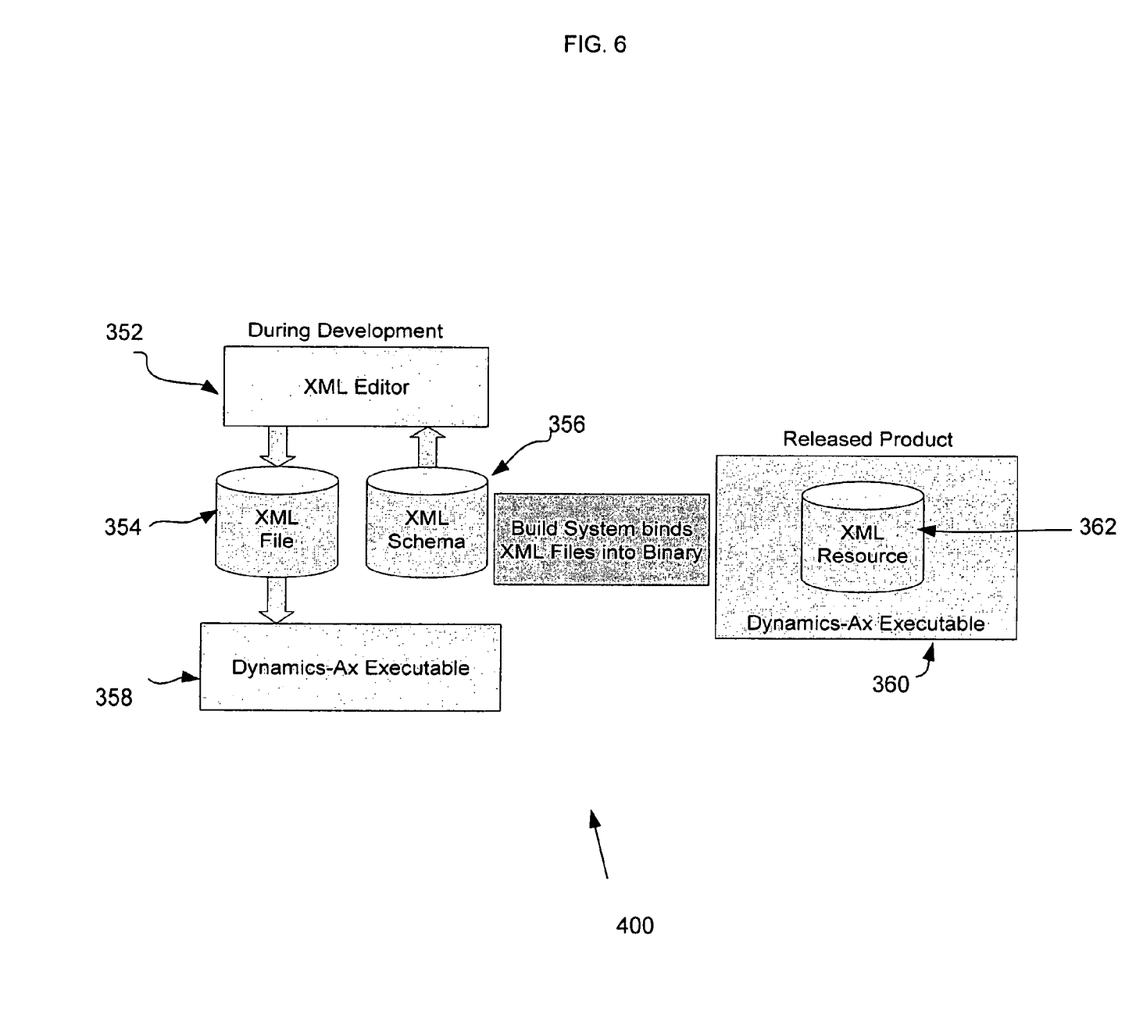
FIG. 6 is an exemplary block diagram of an alternate implementation of the UI property mapping system.

FIG. 6 illustrates an alternate embodiment of a UI property mapping system 350. As shown in FIG. 6, during development the XML generator (such as an XML editor) 352 is used to create the component definition XML file 354 using the component definition XML schema 356. Once the final values of various component properties are determined the component definition XML file 354 may be converted into an executable file, such as a Microsoft™ Dynamic AX™ executable file 358. Such an executable file 358 may be bound to the rest of the executable files (such as a dynamic link library (DLL) file) into the released product 360 as an XML resource 362. In this manner, if an application developer needs to change the properties of UI in an application already being used by a customer, the developer may simply send an updated XML resource file that may be incorporated into the released application to render the changes into the UI. In an alternate embodiment, the application developer may send updates to the customer in the form of a standalone XML file, allowing the customer to know what the update is. In such a case, the customer may decide whether to incorporate the update into the UI or not.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method of mapping a property of a component of an application object by a user type, the user type being one of a plurality of user types having access to change a respective property of the component based on access determined by an identification key associated with the respective property, the method comprising:
   using at least one processor to perform the following:
   building, by a first user type, a plurality of the identification keys for the plurality of user types including the first user type and a second user type, the plurality of the identification keys each including the respective identification key with a respective access for the respective user type, wherein the respective identification key is different from each other, and the identification key includes three parts that identify an application object group of the component, an application object within the component, and a theme of the component, the theme corresponding to an operating system theme setting;
   wherein each property of the component of a plurality of components of the application object is associated with each respective identification key;
   building, by the first user type, a respective component key schema using the respective identification key, wherein the respective component key schema categorizes each object by theme;
   making available, by the first user type, the respective identification key to the respective user type including the second user type, using the respective component key schema;

using the respective component key schema, by the second user type, to build a respective component definition document;

reading the respective component definition document into a property table of the application object; and creating the application object based on a selected operating system theme using the property table.

2. The method of claim 1, wherein the respective component key schema is an XML schema and the component definition document is an XML file.

3. The method of claim 1, wherein the application object is a user interface (UI) that may be used to interact with a user via a combination of an input and an output device.

4. The method of claim 3, wherein the combination of the input and the output device is one provided by at least one of: (1) a desktop computer; (2) a laptop computer; and (3) a personal data assistant.

5. The method of claim 3, wherein the component is at least one of: (1) a toolbar; (2) a window; (3) a border; (4) a button; and (5) a control on the UI.

6. The method of claim 3, wherein using the XML schema to build an XML document further comprises building an XML document external to the application using the application object.

7. The method of claim 2, further comprising converting the component definition document into an executable file and supplying the executable file to an end user with an implementation ready version of the application object.

8. The method of claim 1, wherein the application object is a user interface on a hand-held device.

9. A property mapping system for mapping properties of a component of an application object by a user type, the user type being one of a plurality of user types having access to change a respective property of the component based on access determined by an identification key associated with the respective property, the system comprising:

a network having a plurality of devices, each device having a processor, a memory and an input/output device;

at least one of the devices having a computer code stored on its memory and adapted to operate on its processor to enable a first user type to build a plurality of the identification keys for the plurality of user types including the first user type and a second user type, the plurality of the identification keys each including the respective identification key with a respective access for the respective user type, wherein the respective identification key is different from each other, and the identification key includes three parts that identify an object group of the component, an object within the component and a theme of the component, the theme corresponding to an operating system theme setting;

wherein each property of the component of a plurality of components of the application object is associated with each respective identification key;

at least one of the devices having a computer code stored on its memory and adapted to operate on its processor to enable the first user type to build a respective component key schema using the respective identification key, wherein the respective component key schema categorizes each object by theme;

at least one of the devices having a computer code stored on its memory and adapted to operate on its processor to enable the first user type to make available the respective component key schema to the respective user type including a second user type;

at least one of the devices having a computer code stored on its memory and adapted to operate on its processor to enable the second user type to build a respective component definition document using the respective component key schema;

at least one of the devices having a computer code stored on its memory and adapted to operate on its processor to read the component definition document into a property table of an application object; and at least one of the devices having a computer code stored on its memory and adapted to operate on its processor to create an application object based on a selected operating system theme using the property table.

10. The property mapping system of claim 9, wherein the respective component key schema is an XML schema and the component definition document is an XML file.

11. The property mapping system of claim 9, wherein the application object is a user interface that may be used to interact with a user via a combination of an input and an output device.

12. The property management system of claim 11, wherein at least one of the devices further comprising a computer code stored on its memory and adapted to operate on its processor to convert the component definition document into an executable file and supplying the executable file to an end user with an implementation ready version of the application object.

13. The property management system of claim 11, wherein the application object is a user interface on a hand-held device.

14. A computer-storage medium coupled to a processor and containing computer-executable instructions for execution by the processor and for configuring a component of an application object by a user type, the user type being one of a plurality of user types having access to change a respective property of the component based on access determined by an identification key associated with the respective property, the computer-storage medium comprising instructions to:

generate, by a first user type, a plurality of identification keys for the component for the plurality of user types including the first user type and a second user type, the plurality of the identification keys each including the respective identification key with a respective access for the respective user type, wherein the respective identification key includes three parts that identify an object group of the component, an object within the component and a theme of the component, the theme corresponding to an operating system theme setting;

wherein each property of the component of a plurality of components of the application object is associated with each respective identification key;

generate, by the first user type, a respective component key schema based on the respective identification key, wherein the respective component key schema categorizes each object by theme;

making available, by the first user type, the respective component key schema to the respective user type including the second user type;

generate, by the second user type, a respective component definition document using the respective component key schema;

read the respective component definition document into a property table of the application object; and create the application object based on a selected operating system theme using the property table.

15. The computer-storage medium of claim 14, further comprising instructions to generate an XML component key schema and instructions to generate an XML component definition document using the XML component key schema.

16. The computer-storage medium of claim 14, wherein the application object is a user interface that may be used to interact with a user via a combination of an input and an output device.

17. The computer-storage medium of claim 14, further comprising instructions to convert the respective component definition document into an executable file and to supply the executable file to an end user with an implementation ready version of the application object.

18. The method of claim 1, further comprising displaying an object using a function that is based on the operating system theme.

19. The method of claim 1, further wherein a theme includes a plurality of interdependent display parameters including color, texture, and luminance.

* * * * *